United States Patent [19]

Shockley

[11] 4,361,825
[45] Nov. 30, 1982

[54] AUTOMATIC TRAIN-LINE AIR BRAKE PRESSURE MONITORING SYSTEM

[75] Inventor: James F. Shockley, Ft. Washington, Md.

[73] Assignee: Southern Railway Company, Washington, D.C.

[21] Appl. No.: 150,665

[22] Filed: May 16, 1980

[51] Int. Cl.³ .............................................. B60Q 1/00
[52] U.S. Cl. .............................. 340/52 C; 188/151 A; 246/185; 303/20; 303/DIG. 1; 307/10 R; 307/118; 340/47; 340/60; 340/626
[58] Field of Search .............. 340/52 C, 52 B, 60, 340/67, 69, 47, 611, 614, 626; 246/185, 189; 188/1 A, 3 H, 151 A, 1.11; 303/93, DIG. 1, 100, 101, 20; 307/10 R, 118

[56] References Cited

U.S. PATENT DOCUMENTS

| | | |
|---|---|---|
| 3,593,265 | 7/1971 | Howard et al. |
| 3,652,985 | 3/1972 | Toshioka et al. |
| 3,662,333 | 5/1972 | Howard et al. ............. 188/1 A X |
| 3,748,656 | 7/1973 | Gray et al. |
| 3,778,116 | 12/1973 | Kennedy .................... 340/626 X |
| 3,814,484 | 6/1974 | Matthews et al. ........ 303/DIG. 1 X |
| 3,944,287 | 3/1976 | Nagase . |
| 4,025,781 | 5/1977 | Brearley . |
| 4,051,467 | 9/1977 | Galvin . |
| 4,094,555 | 6/1978 | Byrne et al. ................ 303/100 |

FOREIGN PATENT DOCUMENTS 1438613 6/1976 United Kingdom ......... 303/DIG. 1

Primary Examiner—John W. Caldwell, Sr.
Assistant Examiner—Joseph E. Nowicki
Attorney, Agent, or Firm—Watson, Cole, Grindle & Watson

[57] ABSTRACT

In an automatic train-line air brake pressure monitoring system, a peak detector and hold circuit determines the peak voltage of an input signal representing the air pressure in the air brake system. A signal representing the present peak voltage of the input signal from the previously detected peak voltage is subtracted from the presently detected peak voltage to provide a subtraction output signal such that signals representative of the air brake pressure can be generated. The monitoring system may provide emergency air brake condition signals, as well as a number of programmable monitoring signals representative of different pressures within the air brake pressure system.

12 Claims, 2 Drawing Figures

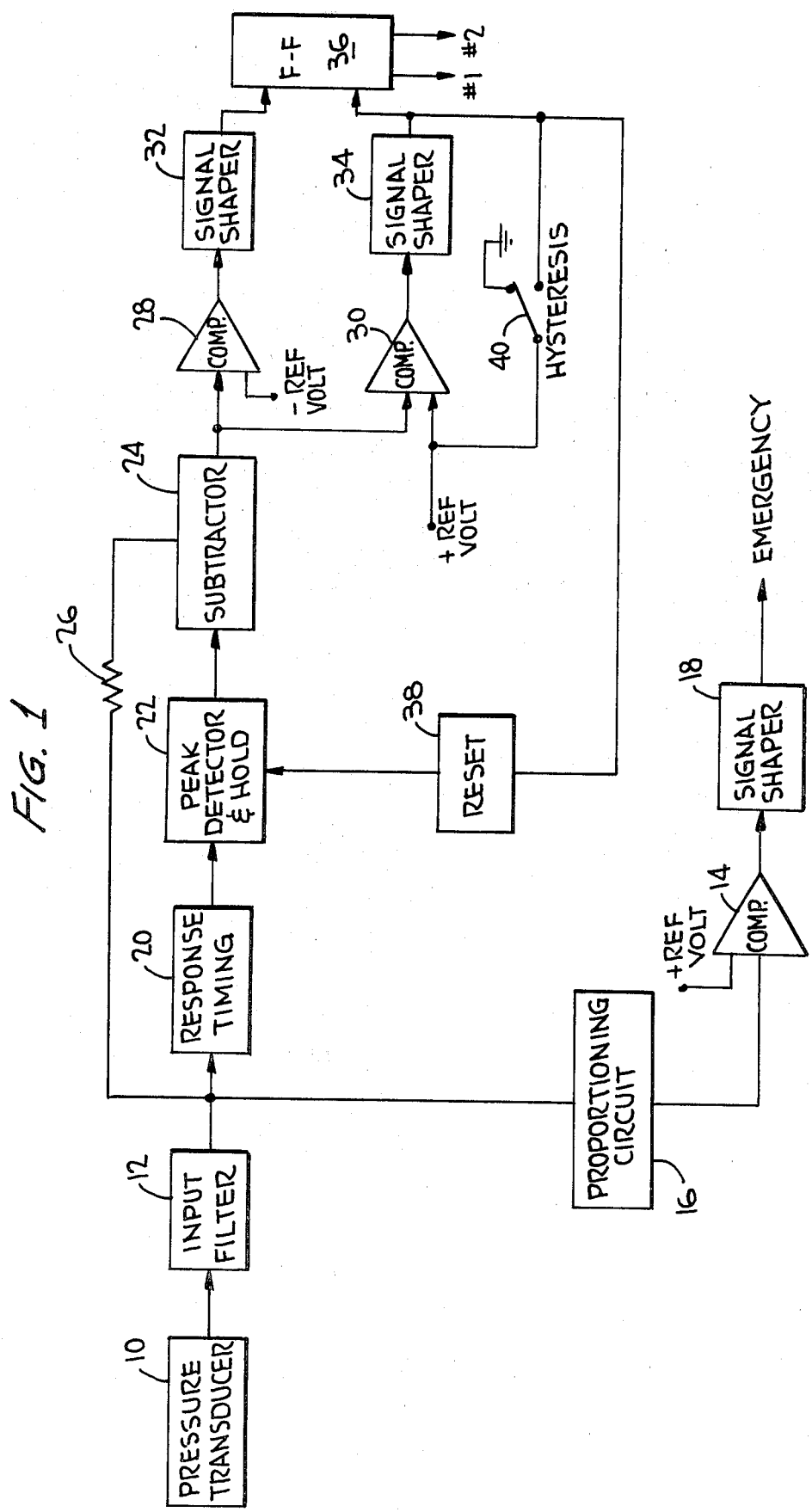

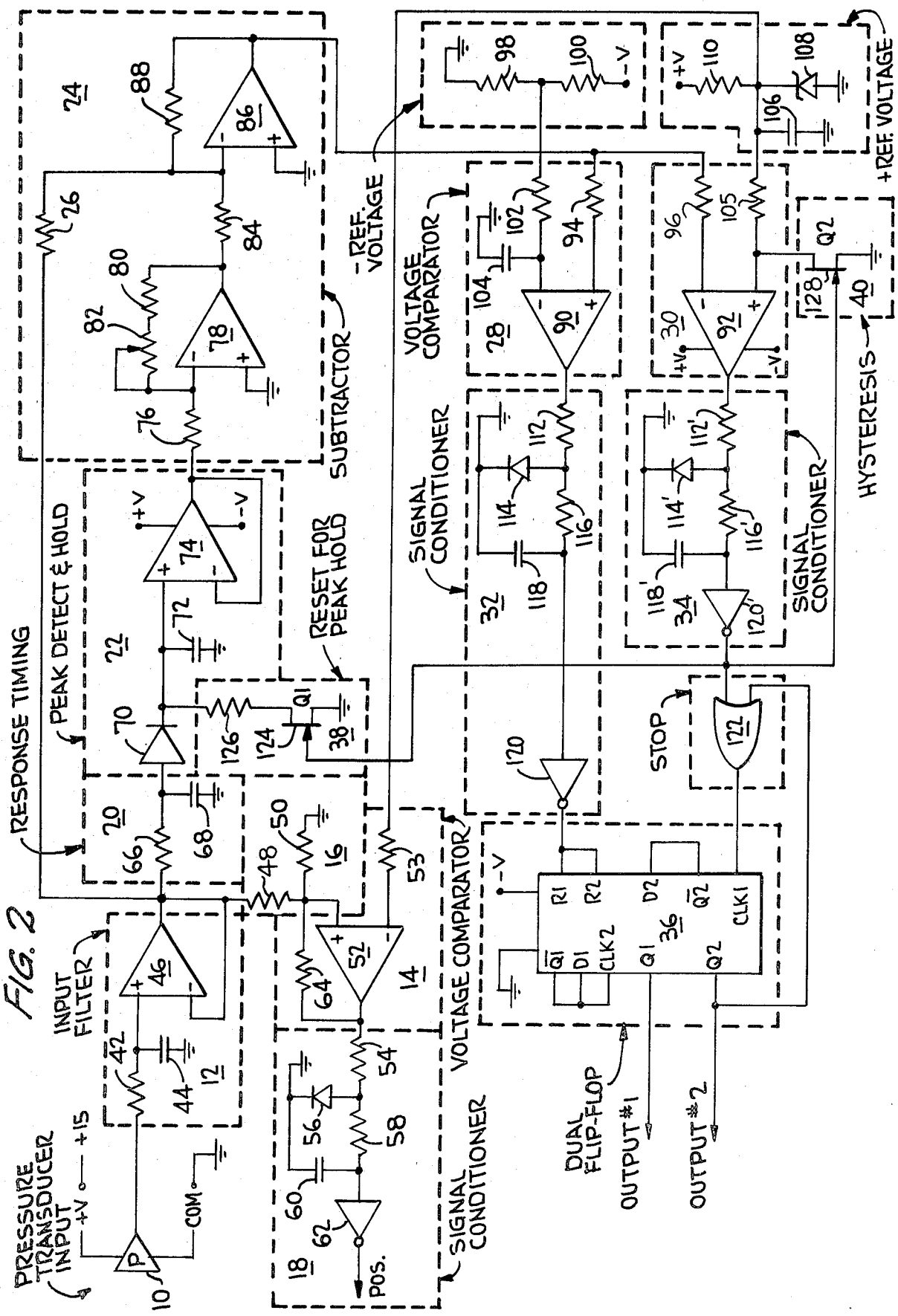

AUTOMATIC TRAIN-LINE AIR BRAKE PRESSURE MONITORING SYSTEM

BACKGROUND

1. Field of the Invention

This invention relates to automatic fluid pressure monitoring systems, and in particular such systems wherein the air brake pressure of a train-line system is monitored to provide signal outputs indicative of the air pressure conditions therein on a continuous basis.

2. Prior Art

Continuous air brake monitoring systems are well known to the art. For example, U.S. Pat. No. 3,944,287 provides continuous monitoring of both a dynamic brake pressure and pneumatic brake pressure for a railroad vehicle and also provides an indication of the accumulative braking pressure of the dynamic brake and the pneumatic brake. Pressure monitoring of multi-line brake systems has been accomplished by utilizing a pressure sensitive switch in each of the brake lines and which is actuatable when the pressure in that line reaches a predetermined threshold value. Such a system is exemplified by the disclosures of U.S. Pat. Nos. 3,593,265 and 4,025,781.

Additionally, complex systems have also been utilized involving an analysis of an electrical waveform for determining an abnormal hydraulic pressure in a brake circuit such as is exemplified by the disclosure of U.S. Pat. No. 3,652,985. Other systems are known which, in addition to responding to an absolute pressure level, also respond to rate and duration of pressure drop, as represented by the disclosure of U.S. Pat. No. 4,051,467.

Fluid pressure monitoring systems may also rely upon detection of a drop in fluid pressure when such drop occurs for a given or predetermined period of time such as presented by the disclosure of U.S. Pat. No. 3,748,656.

SUMMARY OF THE INVENTION

In accordance with the present invention, a continuous monitoring of train-line air brake pressure is achieved by detecting the pressure within the brake line using an auto-referencing peak detector circuit which is periodically reset prior to each pressure detection by a subtraction circuit such that the pressure is always measured with respect to the last measured air brake pressure value. The automatic monitoring system provides output signals on a continuous basis representative of the elapsed time air brakes are applied or released, as well as an indication of the quantity of the braking effort.

Railroad air brake systems typically operate in a released or off position with a compressed air pressure within a range of 70 psi to 100 psi. Application of the brakes causes a reduction in the air pressure on the brake pipe to all the cars. The greater the braking effort, the more air pressure that is removed from the brake pipe. An emergency braking application is provided if the air pressure drops below a certain specified minimum value.

In accordance with the present invention, whenever air pressure is reduced within the brake pipe system, the pressure drop from the maximum (i.e. the released or off position) is measured and quantized, and an output indicative thereof is provided. The number of steps desired to be recorded, that is the number of pressure reductions, and the pressure differential setting for each step can be varied and programmed into the system. The air brake monitoring system also provides means for providing signals indicative of a release of the air brakes, as would occur with an increase of air pressure in the brake line. An emergency output signal can be provided indicative of a reduction of air pressure within the brake line below a predetermined threshold value.

The peak detector holds or stores a maximum detected voltage which is subtracted from the output of a transducer indicating the air pressure in the brake line. Under normal conditions, it is, under a brake released or off condition of the brake system, the resulting voltage output of the subtractor is zero and this provides a signal representing a "brakes released" condition. A drop in the detected pressure of the air line causes a positive signal at the output of the subtractor. When the magnitude of this pressure drop exceeds a pre-set threshold voltage, a "brakes applied" trigger signal output is provided by the monitoring system. The trigger signal output also resets the peak detector to the presently detected transducer voltage, such that the subtractor again has a zero voltage output. Such a process is repeated for each step of brake reduction.

When the brakes are released, the pressure transducer provides an increasing voltage output, and the voltage output of the subtractor therefore goes negative. When such negative signal output of the subtractor exceeds a pre-set threshold, the output signal of the monitoring system provides a "brakes released" signal condition.

The output signals of the automatic air pressure train-line monitoring system can be utilized to actuate a digital or analog recorder to provide a permanent record of the monitoring system outputs.

BRIEF DESCRIPTION OF THE DRAWINGS

The above objects and advantages of the invention will be readily apparent to those skilled in the art with reference to the following description taken in conjunction with the drawings wherein:

FIG. 1 represents a block diagram of the invention; and

FIG. 2 is a circuit schematic representation of the invention.

DETAILED DESCRIPTION OF A PREFERRED EMBODIMENT

With reference to FIG. 1, a known pressure transducer 10 detects the pressure within the brake line of a train air line brake pressure system and provides an output voltage indicative thereof. In the system of the present invention, pressure transducer 10 provides a one volt change in signal for a ten pound change in the pressure within the brake pipe. The output of pressure transducer 10 is input to an input filter which filters electrical signals having a frequency greater than approximately 2 Hz such that signals having a frequency higher than that frequency do not affect the monitoring system. The output of input filter 12 is input to a comparator 14 through a proportional voltage circuit 16 which scales down the output of input filter 12. Additionally, comparator 14 contains a positive reference voltage input of, for example, six volts. Thus, a signal in excess of the plus six volt reference voltage at the input of comparator 14 provides an output signal to signal shaper 18, the output of which represents an emergency signal indicating that the brake pressure in the brake system is below a desired threshold level. Such a signal output from signal shaper 18 indicates that there is an emergency "on" condition of the brakes, either resulting from an emergency braking condition applied by the train operator, or from a loss of pressure in the brake system.

The brake pressure signal output from input filter 12 is also input to response timing circuit 20, which has a response time of approximately twenty seconds, and then input into peak detector and hold circuit 22, which detects the maximum or peak signal input. The output of peak detector and hold circuit 22 is then fed into subtractor circuit 24, which also receives the pressure input signal input to peak detector and hold circuit 22 through resistor 26. Subtractor circuit 24 subtracts the present detected peak or maximum signal from the input last detected peak or maximum signal, and the output of subtractor circuit 24 is provided to comparator circuits 28, 30, which respectively compare the output of the subtractor circuit with a minus and a positive reference voltage. Subtractor circuit 24 is designed to provide an output of one volt per pound of change in brake line pressure.

The respective outputs of comparators 28, 30 are input to signal shapers 32, 34 and the respective outputs of those signal shaper circuits are input to a dual flip-flop circuit 36 which produces outputs 1 and 2 suitable for actuating an appropriate recorder device, such as a digital recorder or display, or a pen recorder. For the purposes of this description of an exemplary embodiment of the invention, only two outputs are provided. However, additional outputs can be obtained simply by adding additional logic circuits in a manner well known to those skilled in the art.

The output of signal shaper 34 is also fed back to a reset circuit 38 which serves to reset peak detector and hold circuit 22 after each sampling of a change in the detected air pressure of the monitored brake system. The feedback from the output of signal shaper 34 is also provided through hysteresis switch 40 to the input of comparator 30 to connect the input of comparator 30 to ground during the period when peak detector and hold circuit 22 is being reset.

A preferred embodiment of the invention is illustrated in the schematic of FIG. 2. The output signal from pressure transducer 10 is input to input filter 12 consisting of resistor 42, capacitor 44 and amplifier 46. The output of amplifier 46 is divided by proportional circuit 16 consisting of resistors 48, 50 with the divided voltage thereof input to the positive input of comparator circuit 14 including voltage comparator 52, input resistor 53 and positive feedback resistor 64. The ratio of resistance of resistor 48 to that of resistor 50 is a function of the plus reference voltage of six volts and the criteria for establishing that pressure (voltage) which constitutes an "emergency" brake-line condition. The other input of comparator circuit 52 receives a positive six volt reference voltage, the purpose of which will be described more fully hereinafter. When the divided voltage to the positive input of voltage comparator 52 is less than the positive reference voltage to the negative input thereof, comparator circuit 14 emits a signal which is fed to signal shaping circuit 18 which consists of resistor 54, diode 56, resistor 58, capacitor 60 and inverter 62 to provide an output thereof which represents an emergency signal that the pressure in the brake system is below a given pressure indicating an emergency brake application in the train brake system.

The output from amplifier 46 is also input to response timing circuit 20 which consists of resistor 66 and capacitor 68 having a time constant of approximately twenty seconds. The voltage across capacitor 68 is fed through diode 70 to charge holding capacitor 72 in the peak detector and hold circuit 22. The voltage signal stored by holding capacitor 72 is amplified by high input impedance amplifier 74, the output of which is fed through resistor 76 to inverter amplifier 78 having fixed feedback resistor 80 and variable feedback resistor 82 to trim the inverting amplifier and calibrate the system. The inverted output of inverter amplifier 78 is input through resistor 84 to the negative input of amplifier 86. The negative input of amplifier 86 also receives the output of input filter amplifier 46 via resistor 26, as previously described. The amplification of amplifier 86 has a gain of ten such that its output represents a one volt per pound change in the pressure input from pressure transducer 10.

The output of amplifier 86 and subtractor circuit 24 is respectively input to the positive and negative input of voltage comparator circuits 28, 30 through resistors 94, 96. The negative input of voltage comparator 90 of voltage comparator circuit 28 receives a minus reference voltage from a voltage divider consisting of resistors 98, 100. The negative reference voltage is input to the negative terminal of voltage comparator 90 through resistors 102. Capacitor 104 connected to the negative input terminal of voltage comparator 90 provides additional filtering of the input reference voltage.

The positive input of voltage comparator 92 of voltage comparator circuit 30 receives a plus six volt reference voltage through resistor 105. In the present embodiment, the positive reference voltage is a six volt voltage produced by Zener diode 108 connected through resistor 110 to the positive fifteen volt power supply. Capacitor 106 provides additional filtering of any high frequency components on the reference voltage.

The respective outputs of voltage comparators 90, 92 are input to respective signal shaping circuits 32, 34 as previously described. Signal shaping circuits 32, 34 are identical and therefore only one of them will be described for the purpose of understanding their structure and operation. The output of voltage comparator 90 is fed through resistor 112 to clamping diode 114, resistor 116 and filter capacitor 118. The voltage stored by capacitor 118 is input to inverter 120 and the output of inverter 120 is fed as one input to dual flip-flop circuit 36.

The output of voltage comparator 92 is fed through signal shaper circuit 34 (comprising the same elements as described above with respect to the signal shaper 32) and input to one input of NOR circuit 122, the output of which is fed to the clock input of dual flip-flop circuit 36. The Q1 output of flip-flop circuit 36 comprises output No. 1 and the Q2 output from flip-flop circuit 36 comprises output No. 2 of the flip-flop and is fed back to the other input of NOR circuit 122. NOR circuit 122 provides a stop function after two cycles have been completed. As previously described, additional brake reduction outputs could be obtained by removal of NOR circuit 122.

The output of inverter 120' in signal shaper 34 is input to the gate of FET transistor 124 to discharge holding capacitor 72 of peak detector and hold circuit 22 through resistor 126. The output from inverter 120' of signal shaper 34 is also fed to the gate of FET 128 forming the hysteresis switch 40 of FIG. 1 to shunt the six volt reference of voltage comparator 92 to ground during the resetting of peak detector and hold circuit 22.

Table I indicates the values of the various components of the circuit schematic illustrated in the preferred embodiment of FIG. 2.

TABLE I

| Component | Value or Type |
|---|---|
| R-26 | 20K |
| R-42 | 100K |
| C-44 | 0.68uf |
| R-48 | 20K |
| R-50 | Infinite (open) |
| R-53 | 20K |
| R-54 | 20K |
| CR-56 | IN4148 |
| R-58 | 20K |
| C-60 | 0.1uf |
| R-64 | 15Meg |
| R-66 | 100K |
| C-68 | 0.1 |
| CR-70 | IN4148 |
| C-72 | 47uf |
| R-76 | 20K |
| R-80 | 16.2K |
| R-82 | 1K |
| R-84 | 16.2K |
| R-88 | 200K |
| R-94 | 20K |
| R-96 | 20K |
| R-98 | 3.3K |
| R-100 | 10K |
| R-102 | 20K |
| R-104 | 20K |
| C-106 | 0.1uf |
| CR-108 | IN5233 |
| R-110 | 1K |
| R-112 | 20K |
| CR-114 | IN4148 |
| R-116 | 10K |
| C-118 | 0.1uf |

The operation of the automatic train-line air brake pressure system illustrated in FIG. 2 is as follows. If the pressure output from pressure transducer 10 is below a specified voltage level (pressure) as determined by voltage dividers 48, 50, voltage comparator 52 is actuated to provide an emergency signal indicating either an emergency brake application, or a pressure in the brake system below a safe pressure.

The present transducer output voltage applied to peak detector and hold circuit 22 is subtracted from the previously detected transducer signal by subtractor 24. Under normal conditions, the resulting voltage is zero and a "brakes released" condition signal is output as output No. 1 from dual flip-flop circuit 36 via voltage comparator 28 and signal shaping circuit 32.

However, with application of the brakes and a reduction of the brake pressure in the brake system, the output signal from pressure transducer 10 decreases, thereby providing a positive signal output at the output of subtractor circuit 24. When the magnitude of that pressure drop exceeds the six volt reference level set on voltage comparator 92 of comparator circuit 30, a "brakes applied" signal output from output No. 1 of dual flip-flop circuit 36 results. The signal output from voltage comparator 92 also resets peak detector and hold circuit 22 via FET 124 so as to provide a zero volt output at the output of subtractor circuit 24. The plus six volt reference input to the positive input of voltage comparator 92 is also grounded during the resetting of peak detector and hold circuit 22, through FET 128, until the output of subtractor circuit 24 obtains zero volts output. If the pressure at transducer 10 continues to decrease or is decreased at a later time, the above process is repeated providing a "brakes applied" output at output No. 2 of circuit 36. NOR circuit 122 inhibits more than two consecutive brake reductions from being detected.

When the brakes in the brake system are released, the pressure transducer output voltage is increased and the voltage at the output of the subtractor goes negative, and when that negative signal exceeds the pre-set negative threshold voltage, output signals No. 1 and No. 2 are reset, indicating a brakes released condition as previously described.

From the above description, it is readily apparent that the automatic train-line air brake pressure monitoring system can be programmed to provide additional outputs and that the pressure differential from the normal "brakes released" pressure can be easily varied merely by changing the positive and negative reference voltages. Also, the minimum threshold pressure at which the emergency brake condition signal is generated can be altered by changing the ratio of the resistances of resistors 48 and 50. A plurality of output signals can be provided by the addition of logic circuitry well known to those skilled in the art. The output signals from such logic circuitry can be applied to digital display apparatus and/or to permanent digital or analog recording apparatus as dictated by the particular application of the automatic train-line air brake pressure monitoring system. The system is also readily adaptable to different values of normal pressures within an air brake pressure system and can be readily modified to accommodate a system operating at a normal pressure of 100 pounds, for example.

The amplifiers, voltage comparators, inverter circuits and the dual flip-flop are all conventional integrated circuit components, which can be readily accommodated on pluggable modules to be operative in association with existing recording systems used by the railroad industry.

What is claimed is:

1. An automatic train-line air brake pressure monitoring system, comprising:
    peak detector and hold circuit means for determining the peak voltage of an input voltage signal representing the air pressure in the air brake system;
    means for subtracting a signal representing the present peak voltage of the input signal from a previously detected peak voltage of the input signal to provide a subtraction output signal;
    output means responsive to said subtraction output signal for generating output signals representative of the air brake pressure; and
    means responsive to at least one of said output signals from said output means for resetting said peak detector and hold circuit means.

2. A monitoring system as in claim 1 further comprising response timing means for delaying the input voltage signal to said peak detector and hold circuit means.

3. A monitoring system as in claim 1 wherein said output means includes first and second comparator means for respectively comparing said subtraction output signal with respect to minus and positive reference signals and providing respective first and second comparator output signals.

4. A monitoring system as in claim 3 wherein said output means further includes flip-flop circuit means responsive to said first and second comparator output signals for generating a plurality of signals each representing a given range of the air brake pressure.

5. A monitoring system as in claim 3 further comprising means responsive to said first comparator output signal for disabling said first comparator during the resetting of said peak detector and hold circuit means.

6. A monitoring system as claimed in claim 3, 4 or 5 further comprising response timing means for delaying the input voltage signal to said peak detector and hold circuit means.

7. A monitoring system as claimed in claim 6 wherein said means for subtracting includes means for conducting the present peak voltage of said input voltage signal and inverter amplifier means responsive to a previously detected peak voltage of the input voltage signal and means responsive to the difference between the conducted present peak voltage and the inverted output of said inverter amplifier means to provide said subtraction output signal.

8. A monitoring system as claimed in claim 7 wherein said means responsive to the difference between the present peak voltage and said inverted output is an amplifier with a fixed gain such that the output thereof represents an amplitude having a specified relationship to the voltage of said input voltage signal.

9. A monitoring system as claimed in claim 5 wherein said second comparator output signal resets said flip-flop circuit means and said second comparator output signal also resets said peak detector and hold circuit means.

10. A monitoring system as claimed in claim 1, 2, 3 or 4 further comprising means for filtering said input voltage signal prior to the determinative of the peak voltage by said peak detector and hold circuit means.

11. A monitoring system as in claim 1 further comprising signal generating means responsive to the input voltage signal for generating a signal indicating that the brake pressure is below a specified minimum pressure.

12. A monitoring system as in claim 11 wherein said signal generating means further includes voltage divider means for dividing said input signal and a voltage comparator means responsive to the divided signal and to a positive reference voltage.

* * * * *